United States Patent
Fischer et al.

[19]

[11] Patent Number: 6,116,084
[45] Date of Patent: Sep. 12, 2000

[54] DEVICE FOR TESTING VEHICLE WHEEL

[75] Inventors: Gerhard Fischer, Darmstadt; Vatroslav Grubisic, Reinheim, both of Germany

[73] Assignee: Fraunhofer Gesellschaft Zur Farderung der Angeswandten Forschung E.V., Munich, Germany

[21] Appl. No.: 09/216,834

[22] Filed: Dec. 21, 1998

[30] Foreign Application Priority Data

Dec. 30, 1997 [DE] Germany ............................ 197 58 241

[51] Int. Cl.$^7$ ................................................. G01M 17/02
[52] U.S. Cl. ..................................................... 73/146
[58] Field of Search ......................................... 73/146, 7, 8

[56] References Cited

U.S. PATENT DOCUMENTS 4,475,383 10/1984 Fischer et al. ............................ 73/146

FOREIGN PATENT DOCUMENTS

0063245 10/1982 European Pat. Off. .
33 41 721 11/1983 Germany .

*Primary Examiner*—William Oen
*Attorney, Agent, or Firm*—Burns, Doane, Swecker & Mathis, L.L.P.

[57] ABSTRACT

A device for testing vehicle wheels, tires, hubs, bearings and bolts therefor under service-like load conditions, includes (a) a mounting device for fastening a vehicle wheel in a rotatable manner and for swivelling the latter into different camber angles; (b) a drum, which is disposed in such a manner around the vehicle wheel that the vehicle wheel may, via a tire situated thereon, be brought into rolling contact with the inner peripheral surface of the drum; (c) a vertical or radial loading device, which for applying a vertical or radial force onto the mounting device is connected to the latter; (d) a lateral or axial loading device for applying a lateral or axial force acting in the lateral or axial direction of the vehicle wheel, the lateral or axial loading device for applying the lateral or axial force onto the mounting device being connected to the latter; (e) at least one ring, which is disposed on the inner peripheral surface of the drum and arranged as a stop ring adjacent to the tire and the flank of the vehicle wheel; and (f) a device for rotating the drum; the vertical or radial loading device and the lateral or axial loading device each being independently connected in an articulated manner to the mounting device, wherein the mounting device is supported in such a displaceable manner that the vehicle wheel, for automatic camber adjustment, is capable of swivelling about the wheel contact point.

15 Claims, 5 Drawing Sheets

$F_v, F_h$ : wheel forces
$F_{vz}, F_{hz}$: cylinder forces
$\gamma$ : camber angle maximum values in program European standard cycle: $+\gamma_{max} = 15°$
$-\gamma_{max} = 15°$

DEVICE FOR TESTING VEHICLE WHEEL

The invention provides a device for testing vehicle wheels, tyres, wheel hubs, wheel bearings and wheel bolts under service-like load conditions, comprising (a) a mounting device for fastening a vehicle wheel in a rotatable manner and for swivelling the latter into different camber angles;

(b) a drum, which is disposed in such a manner around the vehicle wheel that the vehicle wheel may, via a tyre situated thereon, be brought into rolling contact with the inner peripheral surface of the drum;

(c) a vertical or radial loading device, which for applying a vertical or radial force, which acts in the vertical or radial direction of the vehicle wheel, onto the mounting device is connected to the latter;

(d) a lateral or axial loading device for applying a lateral or axial force acting in the lateral or axial direction of the vehicle wheel, the lateral or axial loading device for applying the lateral or axial force onto the mounting device being connected to the latter;

(e) at least one ring, which is disposed on the inner peripheral surface of the drum and arranged as a stop ring adjacent to the tyre and the flank of the vehicle wheel and is chamfered at the side directed towards the tyre; and (f) a device for rotating the drum;

the vertical or radial loading device and the lateral or axial loading device each being independently connected in an articulated manner to the mounting device, wherein the mounting device is moreover supported in such a displaceable manner that the vehicle wheel, for automatic camber adjustment, is capable of swivelling about the wheel contact point.

DEVICE FOR TESTING VEHICLE WHEEL

The invention relates to a device for testing vehicle wheels, tyres, wheel hubs, wheel bearings and wheel bolts under service-like load conditions, comprising (a) a mounting device for fastening a vehicle wheel in a rotatable manner and for swivelling the latter into different camber angles;

(b) a drum, which is disposed in such a manner around the vehicle wheel that the vehicle wheel may via a tyre situated thereon be brought into rolling contact with the inner peripheral surface of the drum;

(c) a vertical or radial loading device, which for applying a vertical or radial force, which acts in the vertical or radial direction of the vehicle wheel, onto the mounting device is connected to the latter;

(d) a lateral or axial loading device for applying a lateral or axial force acting in the lateral or axial direction of the vehicle wheel, the lateral or axial loading device for applying the lateral or axial force onto the mounting device being connected to the latter;

(e) at least one ring, which is disposed on the inner peripheral surface of the drum and arranged as a stop ring adjacent to the tyre and the flank of the vehicle wheel and is chamfered at the side directed towards the tyre; and (f) a device for rotating the drum;

(g) the vertical or radial loading device and the lateral or axial loading device each being independently connected in an articulated manner to the mounting device.

A device of said type is known from European patent specification 63 245 and U.S. Pat. No. 4,475,383.

Furthermore, a device having the above features (a) to (f), i.e. without $he feature (g), is known from German patent specification DE 33 41 721 C2.

In said above-mentioned known devices, the camber of a vehicle wheel to be tested is adjustable. When testing under cornering load conditions, the adjustment of a specific or predetermined camber of the vehicle wheel is particularly necessary for (i) introducing high lateral forces,
(ii) preventing the wheel from running out of the drum,
(iii) simulating a wheel deformation similar to that arising during operation.

The camber angle range is around 15° for small car wheels, around 8° for wide car wheels, around 10° for commercial vehicle single wheels and around 6° for twin wheels.

The problem with tests in the initially mentioned known device (test stand according to EP 0 063 245 B1 and U.S. Pat. No. 4,475,383) lies i.a. in the kinematic conditions of the camber adjustment, which do not correspond to the kinematic conditions desirable for testing, as well as in the big differences created by newly developed vehicle tyres (low-profile tyres with wide rims) and tyre widths, e.g.:

for cars, between 150 mm and 335 mm (sports cars)—factor 2 for lorries with single and twin tyres—factor 3–4.

The automatic, kinematic adjustment inside the test stand from the lever arm ratios alone does not completely cover said big width differences. A wider tyre or a twin wheel of a lorry therefore results in the production of too large a camber angle, which leads to increased stress and premature rupture. The tyre restoring moment is insufficient for limiting the camber angle.

In the test apparatus according to the above-mentioned DE 33 41 721 C2, said problems are even more pronounced because said known test apparatus is designed in such a way that (1) the vehicle wheel is rotatable about a swivel axle, which cuts the wheel axle and extends perpendicular to the wheel axle as well as parallel to the wheel contact surface, so that the camber angle of the wheel—expressed in slightly more general terms—is adjusted by rotating the wheel about a swivel axle far removed from the wheel contact point;

(2) the two force generators, i.e. the vertical or radial loading device and the lateral or axial loading device, are disposed in relation to the vehicle wheel and hence to the mounting device for the vehicle wheel in such a way that the one force generator acts via the other force generator upon the vehicle wheel, i.e. the two force generators are effectively serially connected to one another; and (3) the two force generators are connected merely in a displaceable manner, namely by linear guides to one another and to the mounting device.

The object of the invention is therefore, in particular, to design a device of the type described initially (test stand) in such a way that a test involving the use of a wide variety of vehicle tyres, in particular the use of relatively wide vehicle tyres and commercial vehicle twin wheels with tyres, corresponds to the greatest possible extent to actual conditions, i.e. to service-like load conditions, and so the above problems are overcome.

Said object is achieved according to the invention in that, in a device of the type described initially, the mounting device is moreover supported in such a displaceable manner that the vehicle wheel, for automatic camber adjustment, is capable of swivelling about the wheel contact point.

Figure 5:
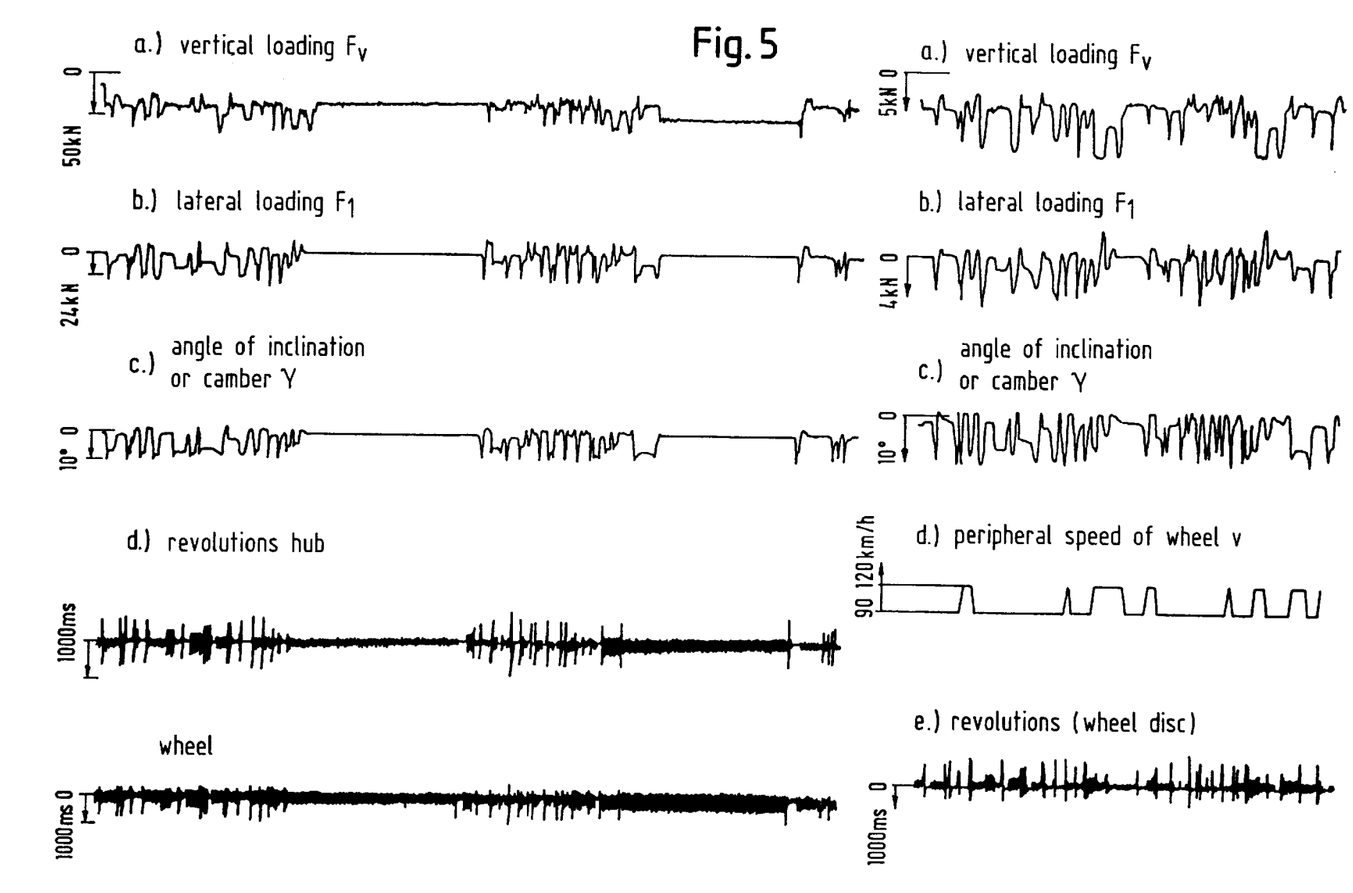
FIGS. 5 and 6 examples of various loading programs realized with the device according to FIG. 1.
Figure 6:
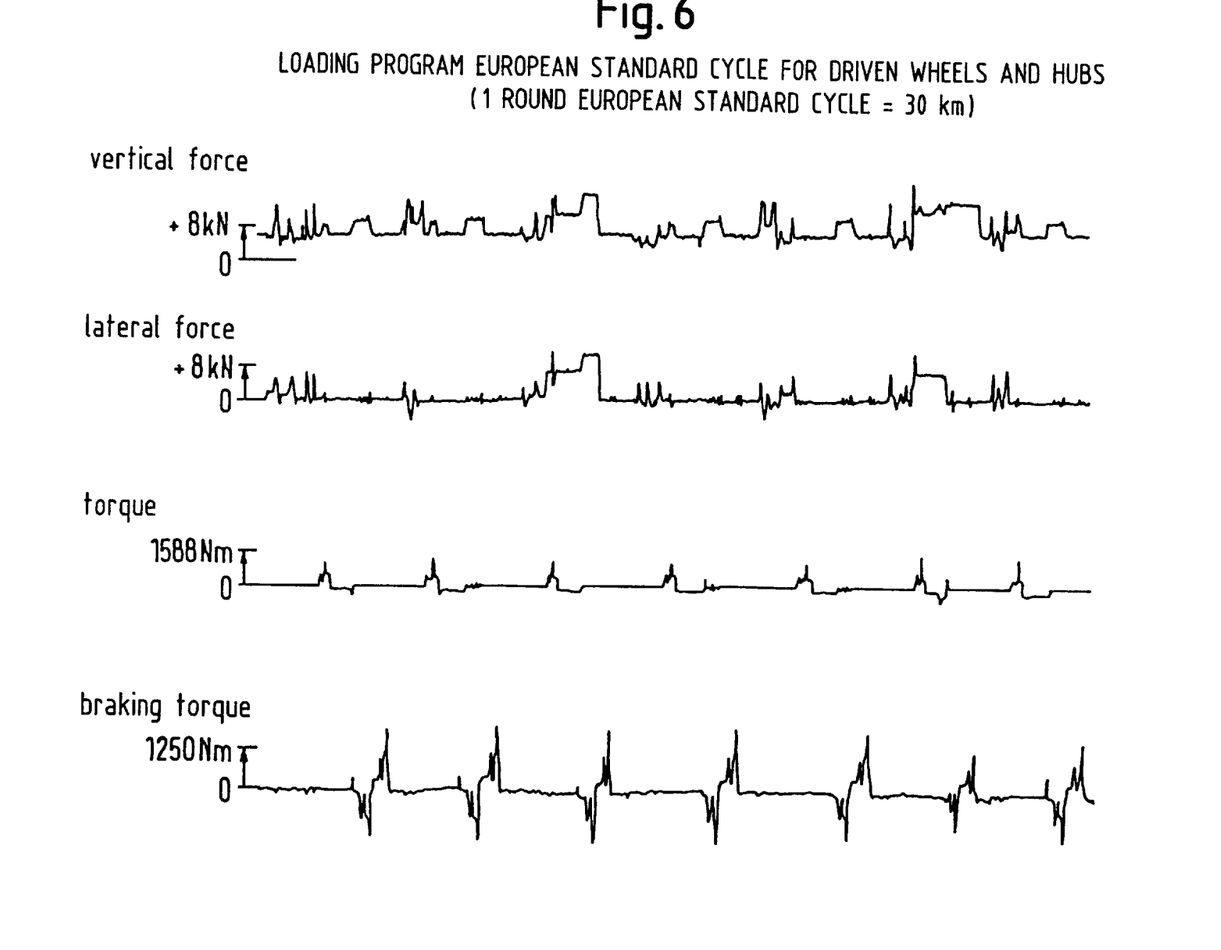

As comprehensive investigations, measurements and tests carried out in the context of the invention by the Fraunhofer Institute for Endurance Strength LBF in Darmstadt have demonstrated, said design of the test device according to the invention results in considerable savings in terms of time, labour and cost in the testing of vehicle wheels, tyres, wheel hubs, wheel bearings and wheel bolts under service-like load conditions, as is explained in detail further below (see, in particular, FIGS. 5 and 6 and the description pertaining thereto).

Based on the extensive experience of the applicant, with a test apparatus of the type described and illustrated in DE 33 41 721 C2, despite the "automatic" camber angle adjustment described there, the kinematic conditions of said automatic camber adjustment make it necessary to carry out comprehensive preliminary tests on vehicles to obtain the control data for the automatic or purposeful adjustment of the camber angle so as to achieve service-like load conditions in order that the tedious test results may be reliably translated into results reflecting actual practice.

In contrast, with the device according to the invention because of the different kinematic conditions provided therein it is possible to manage with a generally elaborated, so-called "basic loading program" without having to carry out additional comprehensive tests for the various wheels and tyre sizes.

A preferred development of the device according to the invention is characterized in that it is provided with a setting apparatus for presetting the maximum camber of the vehicle wheel in such a way that the camber is limited to a predetermined maximum camber angle though smaller camber angles are automatically adjustable in accordance with the ratio of the applied axial and radial force.

A preferred embodiment of said development of the invention is characterized in that the setting apparatus is a limiting device for limiting the maximum swivel angle of the mounting device about a swivel axle, which is perpendicular to the wheel axle and parallel to the wheel contact surface.

It is particularly preferred when the device according to the invention such is constructed in such a way that the setting apparatus is a device for adjusting the moment which is exerted by the lateral or axial loading device, given an unaltered force adjustment thereof, upon the pivotally supported mounting device.

In particular, the setting apparatus may comprise a positioning or arresting apparatus for an attack element of the lateral or axial loading device, which acts via said attack element upon the mounting device in order to generate a moment about the swivel axle of the latter.

Such an embodiment may be so designed that the attack element is a displacement element which is displaceable along an arm on the mounting device rotatable about the swivel axle, the positioning or arresting apparatus preferably being an adjustable stop limiting the maximum effective length of the arm. In particular, the arm may extend perpendicular to the wheel axle and/or perpendicular to the swivel axle.

The device according to the invention may further comprise a device (damping device) which damps the motion of the mounting device, the damping device being disposed in particular between the mounting device and the lateral or axial loading device and/or between the mounting device and the vertical or radial loading device, and in a particularly preferred manner the damping device being disposed between the, or one, arm of the mounting device and the lateral or axial loading device.

To carry out test programs of the type described by way of example further below, the setting apparatus may be adjustable in accordance with a preset program, to which end the setting apparatus is preferably mechanically, electrically or hydraulically adjustable.

The above-mentioned as well as further features and advantages of the invention are described below with the aid of preferred embodiments and with reference to the drawings; the drawings show.

Figure 1:
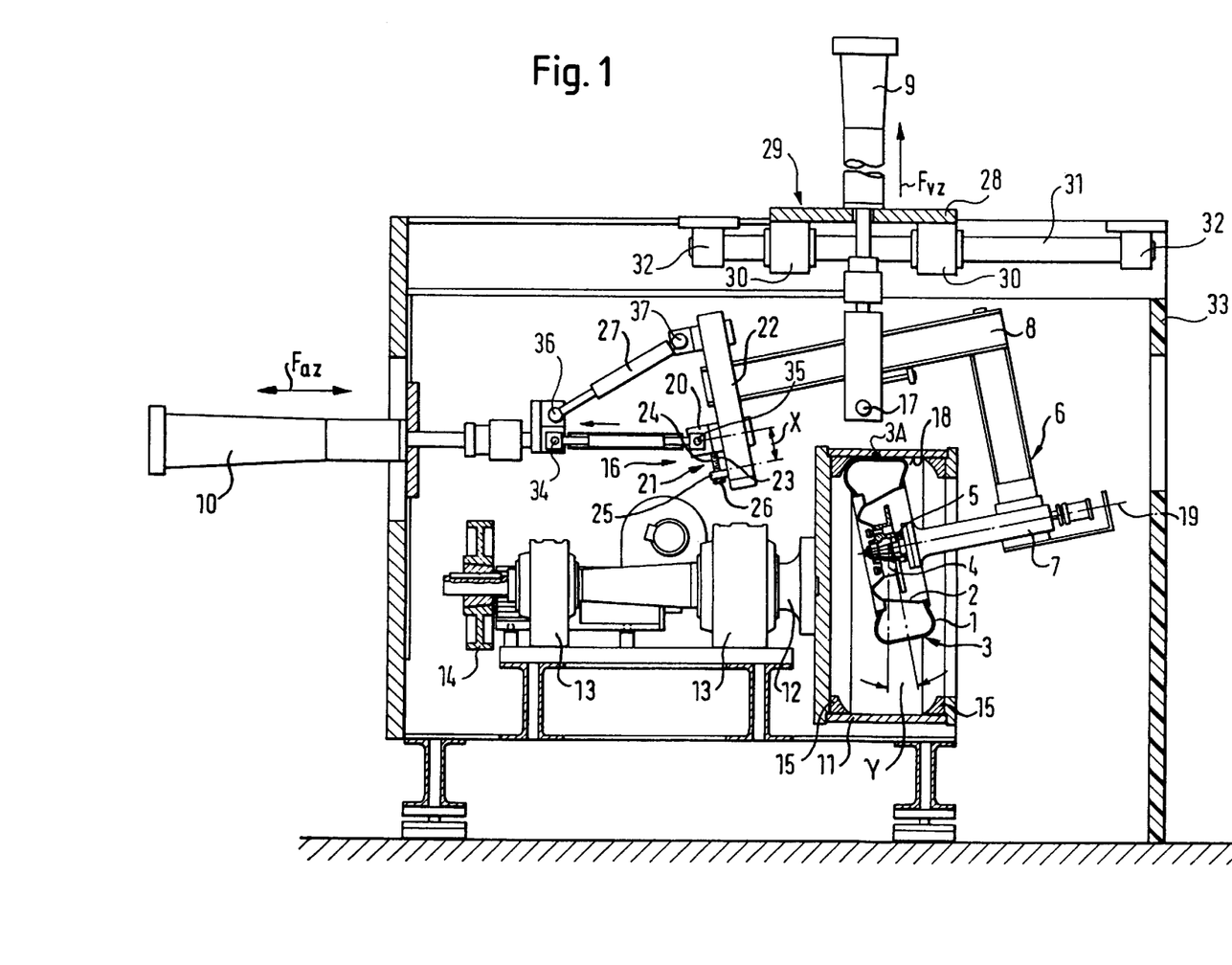
FIG. 1 a part-sectional, diagrammatic front view of an embodiment of the device according to the invention.

Reference is made first to FIG. 1, which shows an embodiment of a device for testing vehicle wheels, wheel hubs, wheel bearings and wheel bolts under service-like load conditions, which device including articles to be tested comprises the following:

a tyre 1 fitted on the rim 2 of a wheel 3, which comprises said rim and a wheel dish, and inflated to rated air pressure or increased air pressure. For fastening the vehicle wheel 3 and taking up the vehicle wheel forces, a wheel hub 4 with wheel bearing 5 is provided. Said wheel hub may be an overdimensioned test hub when, for example, the vehicle wheel 3 or the tyre 1 is to be tested, or it may be an original hub with the appropriate original vehicle bearing arrangement when the wheel hub and/or the vehicle bearing arrangement is to be tested. Transfer of the introduced quasi-static forces into the rotating vehicle wheel 1, 2 is effected by means of the wheel bearing 5 and the axle pin 7. For testing the vehicle wheel 3, overdimensioned wheel bearings 5 are used while, for testing the wheel hub 4 and the wheel bearings 5, the original wheel bearings as well as the original steering knuckles are installed.

The device according to FIG. 1 further comprises a loading bow 8 which, together with the axle pin 7, forms a mounting device 6 for fastening the vehicle wheel 3 in a rotatable manner. Via said loading bow 8, the axle pin 7, the wheel bearings 5, the wheel hub 4 and the wheel bolts a vertical or radial force and a lateral or axial force are introduced into the wheel dish, namely in such a way that the reaction forces arising at the tyre 1 are removed at a defined wheel contact point. For applying a constant or variably high vertical or radial force $F_v$ acting in the radial direction of the vehicle wheel 3, a vertical or radial loading device 9 is provided, which in the present case takes the form of a servo-hydraulic cylinder. Moreover, for applying a constant or variably high lateral or axial force $F_h$ acting in the axial direction of the vehicle wheel 3, a lateral or axial loading device 10 is provided, which in the present case likewise takes the form of a servo-hydraulic cylinder.

Since the terms "vertical force" $F_v$ and "radial force" are synonymous, as are the terms "lateral force" $F_h$ and "axial force", in the following in each case only one or the other of the two terms is employed.

Finally, a drum 11 is provided, which is disposed in such a manner around the vehicle wheel 3 that the vehicle wheel 3 may, via the tyre 1 situated thereon, be brought into rolling contact with the inner peripheral surface of the drum. The drum 11 comprises e.g. a base plate, a drum body and a cover and has two stop rings 15. In said drum 11, in which the vehicle wheel 3 turns, the axial reaction force and the radial reaction force are removed at the wheel contact point 3A or at the wheel contact surface in the tyre 1. The inside diameter of the drum body is significantly greater than the tyre diameter.

A device for rotating the drum 11 is moreover provided, which comprises a drive shaft 12 for fastening the drum 11, bearings 13 for supporting the drive shaft 12 and taking up the radial and axial reaction forces, and a drive motor (not shown) for driving the drive shaft 12 via a V-belt drive 14 and hence for driving the drum 11 and the vehicle wheel 3 as well as for braking the drive shaft 12, the drum 11 and the vehicle wheel 3.

Figure 2:
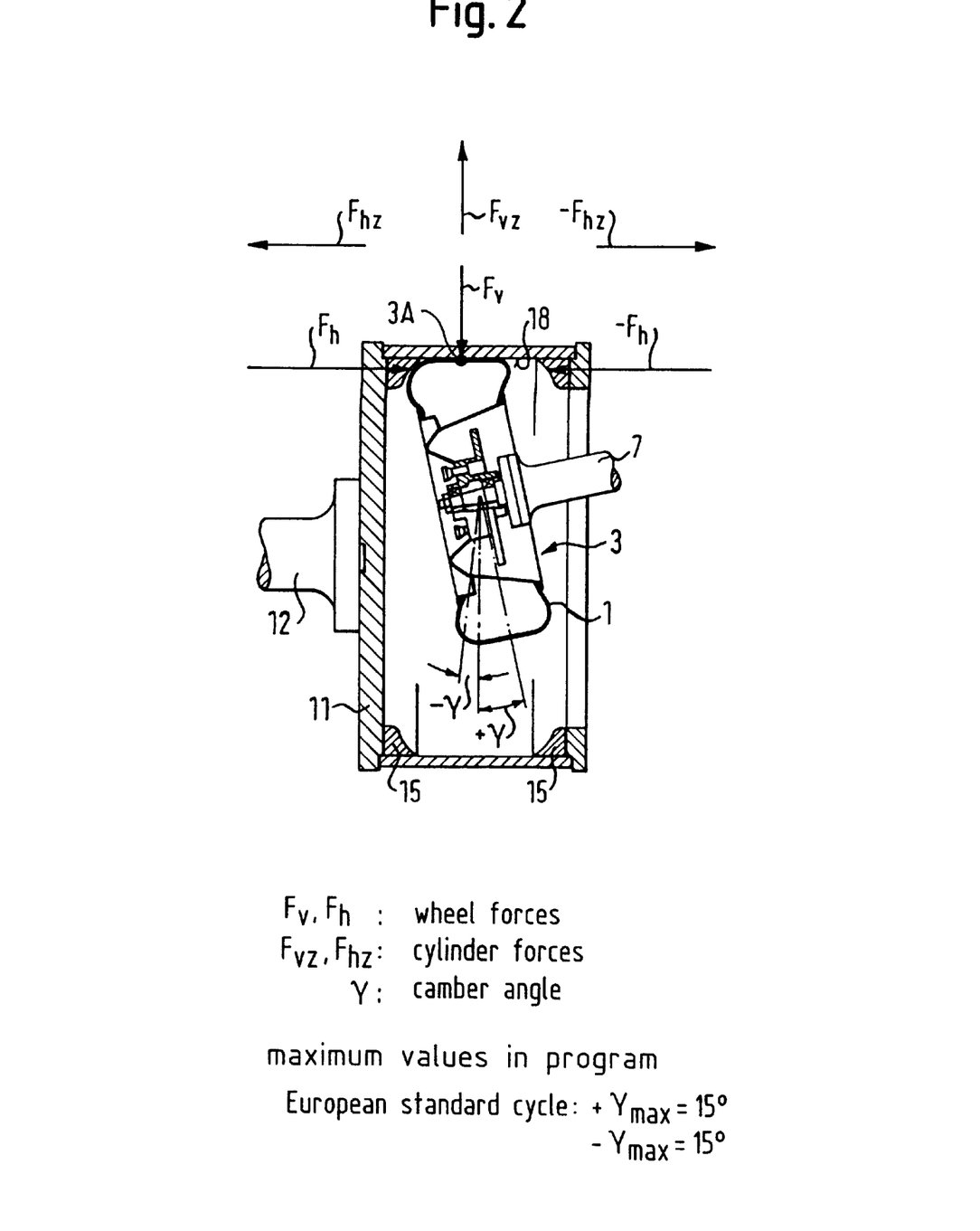
FIG. 2 a representation of the basic forces and camber angle in the device of FIG. 1.

There now follows a detailed description of the connection of the vertical or radial loading device 9 and the lateral or axial loading device 10 to the mounting device 6 and, in conjunction therewith, the mode of operation of the previously described device for testing vehicle wheels, wheel hubs, wheel bearings and wheel bolts under service-like load conditions (see also FIG. 2).

The service-like testing of vehicle wheels 3, wheel hubs 4, wheel bolts and wheel bearings 5 is effected by introducing the wheel forces arising in service via the tyre 1 into the rotating vehicle wheel 3. The wheel forces acting upon the tyre 1 may be radial forces $F_v$, positive axial forces $+F_h$, negative axial forces $-F_h$ as well as tangential forces $F_t$ (driving and braking forces) as well as combinations thereof.

The generation of radial forces acting in the radial direction of the vehicle wheel 3 is first described.

In service, radial forces acting upon the vehicle wheel arise when a vehicle is travelling in a straight-ahead direction, in which case said radial forces may arise to a differing extent depending upon the driving conditions, which may involve e.g. driving over bumpy roads, potholes, frost heaves, level crossings etc., as well as when a vehicle is cornering as a result of the weight transfer. The radial reaction forces acting on the vehicle wheel are generated when at the radial loading device 9 a tensile force is introduced as radial force $F_{vz}$ into the loading bow 8 and the vehicle wheel 3 is supported via the tyre 1 against the rotating drum 11. The deformation, namely the indentation, of the tyre 1 under the radial reaction force produces a wheel contact point, i.e. the reaction force is introduced over a defined region of the tyre circumference and the tyre width, in which case in the wheel region offset by 180° a gap may arise or is deliberately provided between the tyre 1 and the drum body. The precondition for generating purely radial reaction forces in the vehicle wheel 3 is the introduction of said tensile force with the aid of the radial loading device 9 in the wheel centre.

To this end, the vertical or radial loading device 9 is mounted on a base 28, e.g. a plate; and said base 28 by means of a displacement guide 29 is freely displaceable or displaceable in a free-sliding manner horizontally, i.e. parallel to the inner running surface 18 of the drum 11, so that the vertical or radial loading device 9 automatically follows the vehicle wheel upon lateral displacements in the drum 11 and the vertical or radial force $F_{vz}$ is always introduced and/or removed at the wheel contact point 3A. By virtue of the displaceably provided introduction of the vertical or radial force into the loading bow 8 and the mounting device 6, moreover, an adaptation for each tyre width is possible.

In the present case, the displacement guide 29 comprises guide sleeves 30, which are fastened to the base 28 and slidingly displaceable along a guide rod 31 or a plurality of parallel guide rods, which is or are in turn attached by holding devices 32 in a fixed manner e.g. to the frame 33 of the test device. This is however only one embodiment because the displacement guide 29 may be designed in a wide variety of ways to ensure the above mode of operation.

The generation of axial forces acting in the axial direction of the vehicle wheel is next described:

When a vehicle is in operation, axial forces arise during cornering with a force component directed towards the centre of the vehicle, i.e. a positive axial force $+F_h$ at the edge situated at the outside of the bend, and during travel in a straight-ahead direction over bumps, e.g. potholes, in the road, with the result that the force direction may be both towards the centre of the vehicle, which corresponds to a positive axial force $+F_h$, and towards the outside of the vehicle, which corresponds to a negative axial force $-F_h$. During travelling, axial forces may arise only in conjunction with radial forces as load combinations. In the present device, the axial forces acting upon the vehicle wheel are generated as reaction forces with the aid of the axial loading device 10, which takes the form of a servo-hydraulic cylinder.

A positive axial reaction force is produced, given a radial reaction force, by a tensile force at the axial loading device as a reaction force as a result of the supporting of the tyre 1 against the oblique surface of the stop ring 15. The tensile force at the axial loading device 10 is introduced at the level of the inner running surface of the drum body at the wheel contact point 3A, the axial reaction force at the tyre 1 resulting in the region of the wheel contact surface over a limited region of the circumference of the tyre. The introduction of the axial force at the level of the wheel contact points guarantees lever arm ratios which are identical to practical conditions. A negative axial reaction force is generated, given a radial reaction force, by a compressive force at the axial loading device 10 with the result that the axial reaction force at the vehicle wheel arises as a result of run-off of the tyre 1 at the outer stop ring 15.

The stop rings 15 are disposed in the drum body in a displaceable manner so that an adaptation to any desired tyre width or vehicle wheel size is possible, this being necessary on account of the limited cylinder travel of the servo-hydraulic cylinder forming the axial loading device 10.

The positive engagement arising as a result of introducing the axial reaction forces via the stop rings 15 allows, in principle, any desired ratio between axial and radial reaction force to be achieved with the present device.

The radial loading device 9 and the axial loading device 10 are controlled independently of one another so that any desired load combination consisting of radial forces $F_v$ and positive axial forces $+F_h$ as well as negative axial forces $-F_h$ may be adjusted. As a result, a service-like, random simulation of all load situations arising during operation is possible.

An important factor for the swivelling of the vehicle wheel about the wheel contact point 3A which is effected in the device according to the invention is, in conjunction with the ability of the vertical or radial loading device 9 and, with it, the mounting device 6 to be freely or automatically displaced in the manner provided according to the invention and described above, the ability of the mounting device 6 or the loading bow 8 to swivel about the swivel axle 17, which is parallel to the wheel contact surface and perpendicular to the wheel axle 19 and by means of which the mounting device 6 or the loading bow 8 is connected in an articulated manner to the vertical or radial loading device 9.

For the ability of the vehicle wheel 3 to swivel about the wheel contact point 3A or the wheel contact surface, i.e. about a virtual axis which is parallel to the swivel axle 17 and perpendicular to the direction of displacement made possible by the displacement apparatus 29, is made possible by the free displaceability of the mounting device 6 or the loading bow 8 along the displacement guide 29 and by the simultaneous ability of the mounting device 6 or the loading bow 8 to swivel about the swivel axle 17. For, when the vehicle wheel 3 swivels about the wheel contact point 3A in the sense of a camber angle variation, the following are simultaneously effected:

(a) a displacement of the mounting device 6 together with the vertical or radial loading device 9 along the displacement guide 29, and
   (b) a swivelling of the mounting device 6 about the swivel axle 17.

The fact that the vertical or radial loading device 9 together with the mounting device 6 is freely displaceable guarantees that the vertical or radial force $F_{vz}$, even in the event of lateral displacement or drifting of the vehicle wheel 3 towards one or the other of the two stop rings 15, always acts upon or is removed from the wheel contact point 3A.

An, in comparison, "poorer" embodiment of the invention, which works satisfactorily if the position of the wheel contact point 3A was to be held fast in an axial direction of the drum 11, is such that the mounting device is freely displaceable along a linear displacement guide (not shown), which is rotatable about the swivel axle 17. In said manner, the vehicle wheel 3 could likewise swivel about the wheel contact point 3A in the sense of a camber adjustment, while the vertical or radial loading device 9 remains stationary. In order then to be able to adjust the wheel contact point 3A parallel to the axis of the drum 11, the vertical or radial loading device 9 would have to be adjustable in the sense of the displacement bearing arrangement 29.

There now follows a description of the construction of the further provided setting apparatus 16 for presetting the camber angle of the vehicle wheel 3 in such a way that the camber is limited to a predetermined maximum camber angle though smaller camber angles (intermediate size) arise automatically in accordance with the ratio of the applied axial and radial force:

In the present case, the setting apparatus 16 is generally a limiting device for limiting the maximum camber angle and hence the swivel angle of the mounting device 6 or 7, 8 about the swivel axle 17, which is perpendicular to the wheel axle 19 and parallel to the wheel contact surface 18, or about the wheel contact point 3A. The setting apparatus 16 comprises a positioning or arresting apparatus 21 for an attack element 20 of the lateral or axial loading device 10, which acts via said attack element upon the mounting device 8, 7 in order to generate a moment about the swivel axle 17 of the latter.

In the present case, the attack element 20 is a displacement element, which is displaceable along an arm 22 on the mounting device 8, 7 which is rotatable about the swivel axle 17, and the positioning or arresting apparatus 21 is an adjustable stop 23 for the displacement element 20, which stop limits the maximum effective length of the arm 22 and takes the form of a threaded bolt 24, which is adjustable parallel to the arm 22 in a nut 25 fixed on the arm 22 and is lockable by means of a lock nut 26.

The setting apparatus 16 may however alternatively take the form of, for example, a hydraulically or electrically adjustable positioning and arresting apparatus, i.e. a remotely adjustable setting apparatus.

In the present case, the setting apparatus 16 is a device for adjusting the moment, which is exerted by the lateral or axial loading device 10, given an unaltered force adjustment thereof, upon the pivotally supported mounting device 8, 7, for the limiting of the maximum camber angle is effected by a presetting of the lateral force introduction, for example, mechanically, electrically or hydraulically.

Figure 3:
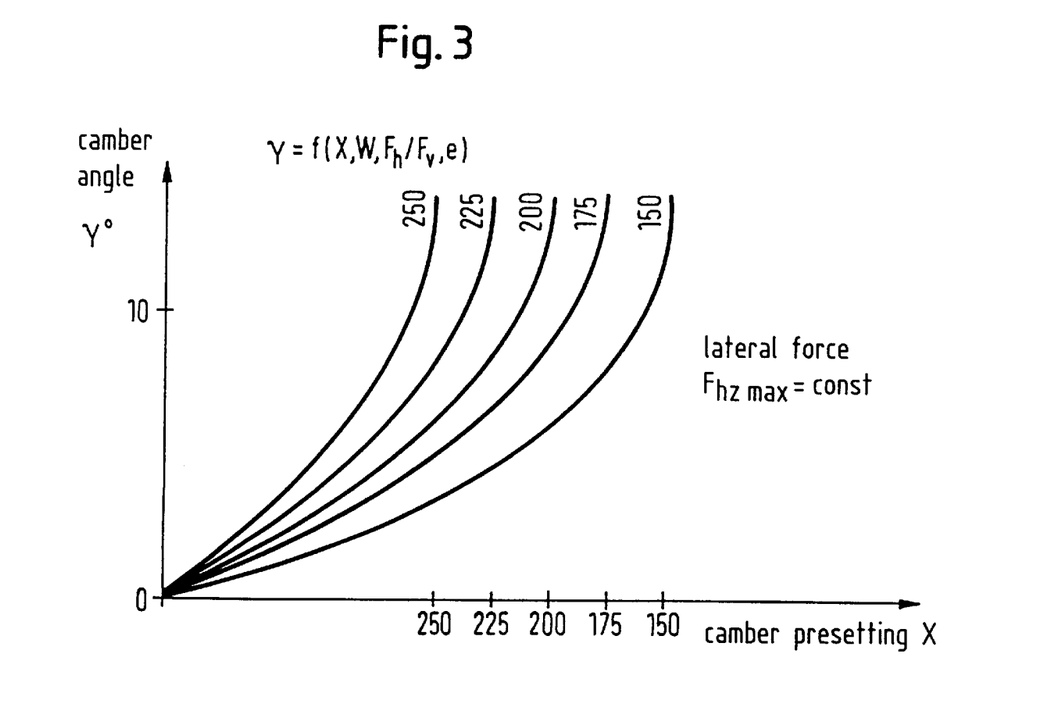
FIG. 3 a set of curves showing the camber angle as a function of the camber presetting X, i.e. the setting of the maximum camber angle for tests in the device according to FIG. 1.
Figure 4:
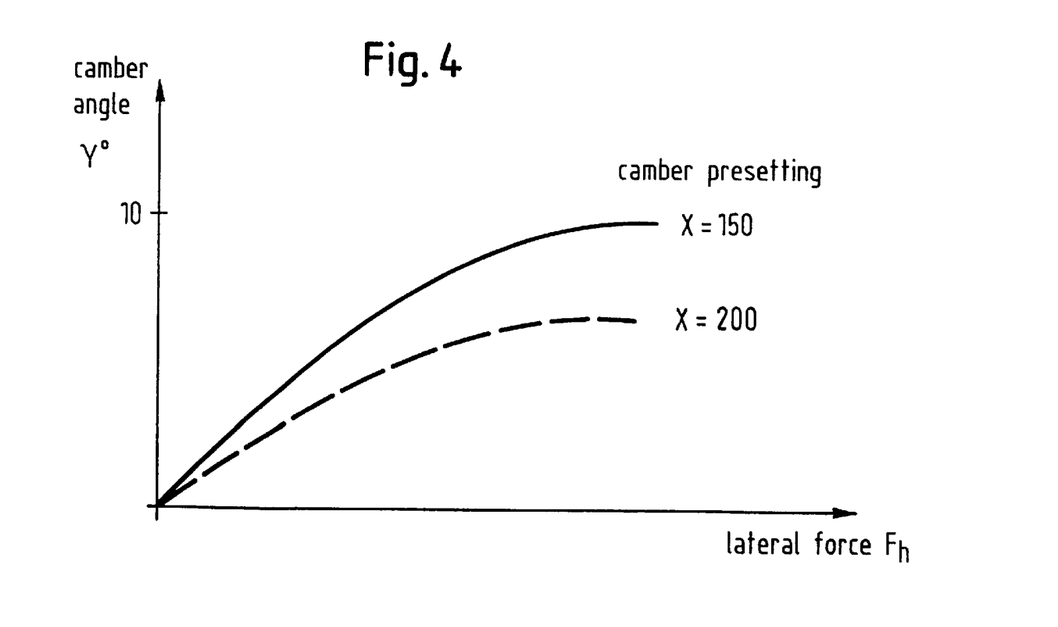
FIG. 4 two curves showing the dependence of the camber angle upon the lateral force for various camber presettings X for tests in the device according to FIG. 1.

By increasing the distance X, a smaller moment is generated by $F_{hz}$ and the camber angle $\gamma$ is reduced. For all intermediate quantities of $F_{hz}$ or $F_{vz}$ there follows analogously a reduced camber angle $\gamma$ in accordance with a characteristic as shown in FIGS. 3 and 4, in which X is the distance shown in FIG. 1 (camber presetting), W the tyre width and e the indentation depth of the wheel.

Once presetting has been effected, all intermediate sizes of the camber angle arise automatically in accordance with the magnitude of the force $F_{vz}$, $F_{hz}$ and the kinematics. In said case, it is therefore possible to dispense with a hydraulic cylinder for camber adjustment and with the associated, complex control system of said cylinder.

The optimum characteristic, which leads to correspondingly accurate stresses at the components, wheel and hub, is determined through measurement with strain gauges. It therefore follows that discrete settings or positionings are sufficient for the camber presettings. The values are usually between 150 mm and 250 mm for tests on car wheels and between 170 mm and 350 mm for commercial vehicle wheels.

This is a substantial improvement even in comparison to apparatuses having the generation of additional controlled variables of the camber angle by means of hydraulic cylinders. Said variables have to be continuously programmed in each load stage and do not follow the single characteristic. In said case, laborious operational measurements are necessary in advance in order to be able to derive the correct camber control signals. In addition, a hydraulic camber adjustment cylinder considerably increases the cost of the test device and of testing.

For damping the motion of the mounting device 8, 7, a damping device 27 is moreover disposed between the arm 22 of the mounting device 8, 7 and the lateral or axial loading device 10.

The lateral or axial loading device 10 and the damping device 27 are connected by joints 34, 35, 36 and 37 to the arm 22.

For control of the present wheel test stand, including braking and driving forces, a 4-channel control program is used, which simulates specific load situations including cornering and travel in a straight-ahead direction. The program is provided as a basic program for fixed parameters. Examples are shown in FIGS. 5 and 6.

For new components, said program for the respective load situations of travel in a straight-ahead direction, cornering, braking and accelerating has to be adapted to the specific vehicle data. Said adaptation is effected in accordance with the loading scheme illustrated in the table below. In said loading scheme, in accordance with the cartesian coordinates the radial or vertical force $F_v$ is denoted by $F_z$, the lateral or axial force $F_h$ by $F_y$ and the braking force by $F_{XB}$. The control channels are varied in intensity in the respective loading sections by the load factors. The load factors are derived from the vehicle data or determined metrologically. The load sequence itself remains, in said case, identical.

The device according to the invention may be used, e.g. in the above-mentioned manner, to verify the endurance strength of vehicle wheels and vehicle wheel components as early as in the initial stage of their development, without there having to be a vehicle for carrying out the operational measurements. The basic loading program contains the essential driving sections, which are adapted merely with the aid of the loading data (factors) derived computationally for the new vehicle. Previous tests first required a prototype vehicle, which had to suitably equipped, to carry out extensive measurements. The loading data were therefore available only at the end of a development phase.

TABLE

LOADING DATA (FACTORS) FOR PROGRAM ADAPTATION

| Loading section Forces | I<br>Straight ahead<br>S | II<br>Cornering<br>K | III<br>Braking<br>B | IV<br>Driving<br>A |
|---|---|---|---|---|
| Vertical force $F_z$ | $n_{zs} \cdot F_{zstat}$ | $n_{zk} \cdot F_{zstat}$ | $n_{zB} \cdot F_{zstat}$ | $n_{zA} \cdot F_{zstat}$ |
| Lateral force $F_y$ | $n_{ys} \cdot F_{zstat}$ | $n_{yk} \cdot F_{zstat}$ | $n_{yB} \cdot F_{zstat}$ | $n_{yA} \cdot F_{zstat}$ |
| Braking force $F_{XB}$ | — | — | $n_{FXB} \cdot \pm F_B$ | — |
| Driving torque/ operating torque $M_{XB}$ | — | — | — | $n_M = M_X$ |

Load factors (adaptation data for vehicle)
$n_z$ - for vertical force
$n_y$ - for lateral force
$n_{FXB}$ - for braking force
$n_M$ - for driving/trailing torque or operating torque
Vehicle data
$F_{zstat}$ - static wheel load
$\pm F_B$ - braking force (forward/backward)
$\pm M_X$ - driving/operating torque

We claim:

1. Device for testing vehicle wheels, tyres, wheel hubs, wheel bearings and wheel bolts under service-like load conditions, comprising:
   (a) a mounting device for fastening a vehicle wheel in a rotatable manner and for swivelling the latter into different camber angles;
   (b) a drum, which is disposed in such a manner around the vehicle wheel that the vehicle wheel may, via a tyre situated thereon, be brought into rolling contact with the inner peripheral surface of the drum;
   (c) a vertical or radial loading device, which for applying a vertical or radial force, which acts in the vertical or radial direction of the vehicle wheel, onto the mounting device is connected to the latter;
   (d) a lateral or axial loading device for applying a lateral or axial force acting in the lateral or axial direction of the vehicle wheel, the lateral or axial loading device for applying the lateral or axial force onto the mounting device being connected to the latter;
   (e) a least one ring, which is disposed on the inner peripheral surface of the drum and arranged as a stop ring adjacent to the tyre and the flank of the vehicle wheel and is chamfered at the side directed towards the tyre; and
   (f) a device for rotating the drum;
   (g) the vertical or radial loading device and the lateral or axial loading device each being independently connected in an articulated manner to the mounting device;
   wherein the mounting device is supported in such a displaceable manner that the vehicle wheel, for automatic camber adjustment, is capable of swivelling about the wheel contact point.

2. Device according to claim 1, wherein the mounting device together with the vertical or radial loading device is supported displaceably parallel to the inner peripheral surface of the drum.

3. Device according to claim 1 or 2, further comprising a setting apparatus for presetting the maximum camber of the vehicle wheel in such a way that the camber is limited to a predetermined maximum camber angle though smaller camber angles are automatically adjustable in accordance with the ratio of the applied axial and radial force.

4. Device according to claim 3, wherein the setting apparatus is a limiting device for limiting the maximum swivel angle of the mounting device about a swivel axle, which is perpendicular to the wheel axle and parallel to the wheel contact surface.

5. Device according to claim 3, wherein the setting apparatus is a device for adjusting the moment which is exerted by the lateral or axial loading device given an unaltered force adjustment thereof, upon the pivotally supported mounting device.

6. Device according to claim 3, wherein the setting apparatus comprises a positioning or arresting apparatus for an attack element of the lateral or axial loading element, which via said loading device acts upon the mounting device in order to generate a moment about the swivel axle of the latter.

7. Device according to claim 6, wherein the attack element is a displacement element, which is displaceable or relocatable in some other manner along an arm on the mounting device which is rotatable about the swivel axle.

8. Device according to claim 6, wherein the positioning or arresting apparatus is an adjustable stop limiting the maximum effective length of the arm.

9. Device according to claim 7, wherein the arm extends perpendicular to the wheel axle.

10. Device according to claim 7, wherein the arm extends perpendicular to the swivel axle.

11. Device according to claim 1, further comprising a damping device which damps the motion of the mounting device.

12. Device according to claim 11, wherein the damping device is disposed between the mounting device and the lateral or axial loading device and/or between the mounting device and the vertical or radial loading device.

13. Device according to claim 11, wherein the damping device is disposed between the, or one, arm of the mounting device and the lateral or axial loading device.

14. Device according to claim 3, wherein the setting apparatus is mechanically, electrically or hydraulically adjustable.

15. Device according to claim 3, wherein the setting apparatus is adjustable in accordance with a preset program.

* * * * *